(12) United States Patent
Knepler

(10) Patent No.: US 6,465,035 B1
(45) Date of Patent: *Oct. 15, 2002

(54) BEVERAGE MAKER-FUNNEL COMBINATION AND METHOD OF USE

(75) Inventor: John T. Knepler, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/472,367

(22) Filed: Dec. 23, 1999

Related U.S. Application Data

(63) Continuation-in-part of application No. 09/337,102, filed on Jun. 21, 1999, now Pat. No. 6,238,721.

(51) Int. Cl.[7] .............................. A23L 2/00; G01N 33/02
(52) U.S. Cl. ........................ 426/590; 99/250; 99/289 R; 99/323; 426/231; 426/433
(58) Field of Search ................................ 426/231, 433, 426/435, 590; 99/280, 282, 283, 285, 289 R; 141/94, 95, 192, 198, DIG. 1

(56) References Cited

U.S. PATENT DOCUMENTS

| | | | |
|---|---|---|---|
| 3,423,209 A | 1/1969 | Weber | 99/71 |
| 4,468,406 A | 8/1984 | d'Alayer de Costemore d'Arc | 426/231 |
| 5,072,660 A | 12/1991 | Helbling | 99/280 |
| 5,094,153 A | 3/1992 | Helbling | 99/280 |
| 5,158,793 A | 10/1992 | Helbling | 426/231 |
| 5,186,399 A | 2/1993 | Knepler et al. | 99/286 |
| 5,375,508 A | 12/1994 | Knepler et al. | 99/283 |
| 5,417,145 A | 5/1995 | Joseph, Jr. et al. | 99/280 |
| 5,511,465 A | 4/1996 | Friedrich et al. | 99/286 |
| 5,542,342 A | 8/1996 | McNeill et al. | 99/280 |
| 5,568,763 A | 10/1996 | Kunzler | 99/280 |
| 5,724,882 A | 3/1998 | Gallas et al. | 99/285 |
| 5,858,437 A * | 1/1999 | Anson | 426/435 |
| 6,067,894 A | 5/2000 | Eugster | 99/285 |
| 6,238,721 B1 * | 5/2001 | Knepler | 426/590 |

OTHER PUBLICATIONS

Data Sheet for Ratiometric Linear Hall Effect Sensor, Optek Technology, Inc. Product Bulletin OHN3506/3507, Aug. 1996.

Optek Technology, Inc, Product Bulletin OHN3506/3507, Ratiometric Linear Hall Effect Sensor, Aug. 1996.

* cited by examiner

Primary Examiner—George C. Yeung
(74) Attorney, Agent, or Firm—Barnes & Thornburg

(57) ABSTRACT

A brew funnel has a selector thereon which can be set to indicate a desired batch size and type of coffee. Sensors on an associated coffee grinder and on an associated coffee brewer are capable of sensing the structure to grind an appropriate amount of coffee and to brew an appropriate amount of coffee, respectively, when the brew funnel is mounted thereon.

7 Claims, 5 Drawing Sheets

FIG. 3
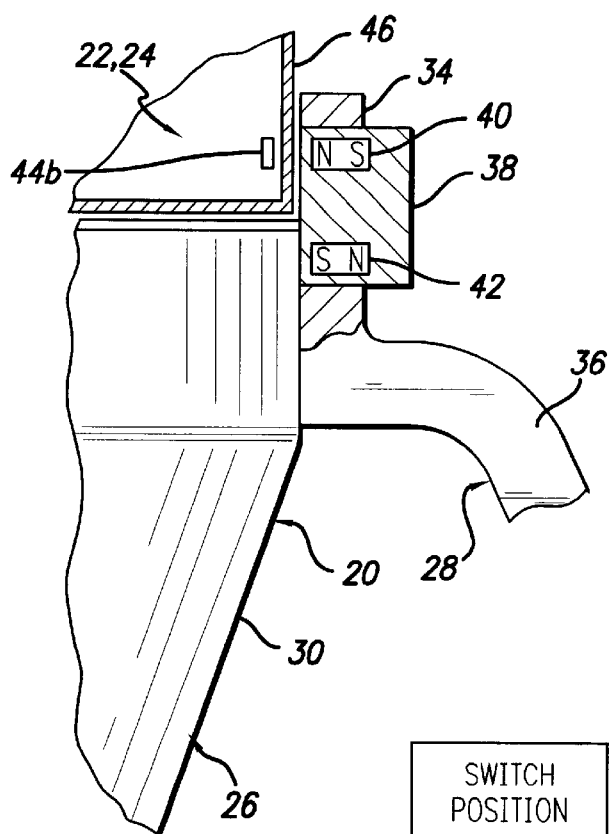
FIG. 4
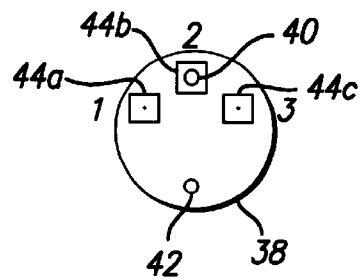
FIG. 5
| SWITCH POSITION | | SENSOR | | |
|---|---|---|---|---|
| | | 1 | 2 | 3 |
| REG | SMALL | + | 0 | 0 |
| | MED. | 0 | + | 0 |
| | LARGE | 0 | 0 | + |
| DECAF. | S | − | 0 | 0 |
| | M | 0 | − | 0 |
| | L | 0 | 0 | − |
OUTPUT CHART
0 VOLTAGE WITH NO MAGNET
− NEGATIVE GOING
+ POSITIVE GOING
FIG. 6
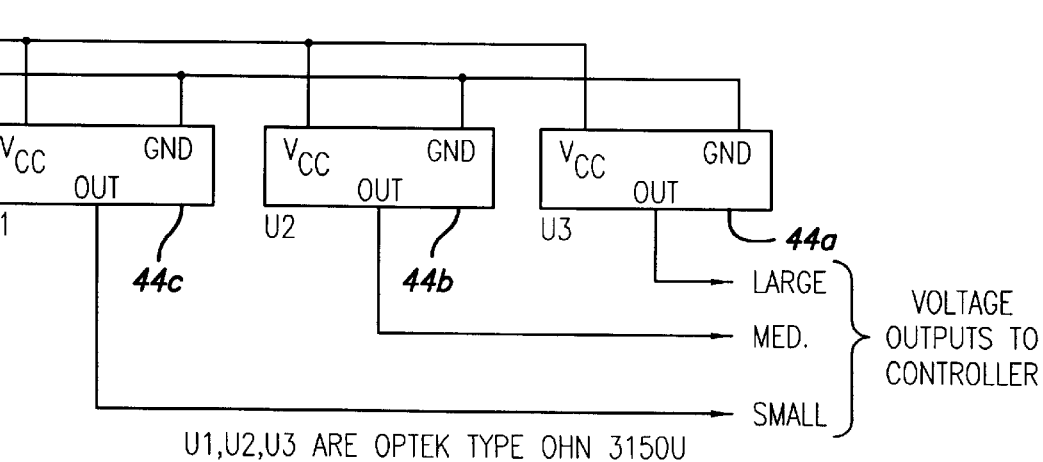
U1,U2,U3 ARE OPTEK TYPE OHN 3150U FIG. 9
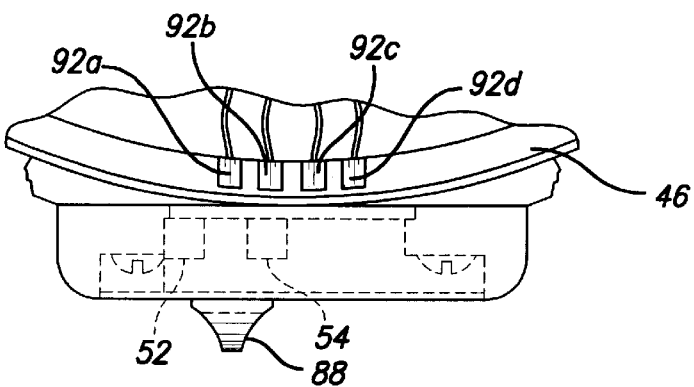
FIG. 10
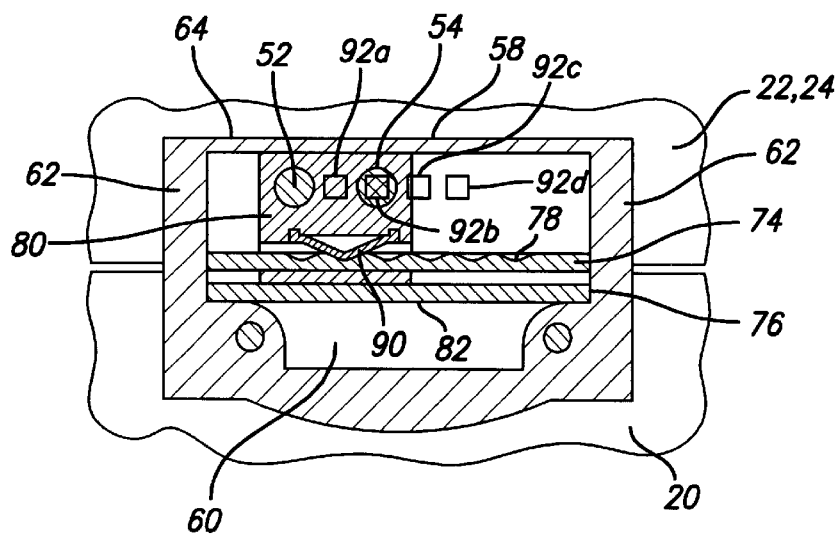
FIG. 11
0 = VOLTAGE WITH NO MAGNET
− NEGATIVE GOING
+ POSITIVE GOING
| SWITCH POSITION | | | SENSOR | | | |
|---|---|---|---|---|---|---|
| | | | 1 | 2 | 3 | 4 |
| R E G U L A R | SMALL | 1 | + | 0 | 0 | 0 |
| | MEDIUM | 2 | 0 | + | 0 | 0 |
| | LARGE | 3 | − | 0 | + | 0 |
| D E C A F | SMALL | 4 | 0 | − | 0 | + |
| | MEDIUM | 5 | 0 | 0 | − | 0 |
| | LARGE | 6 | 0 | 0 | 0 | − |

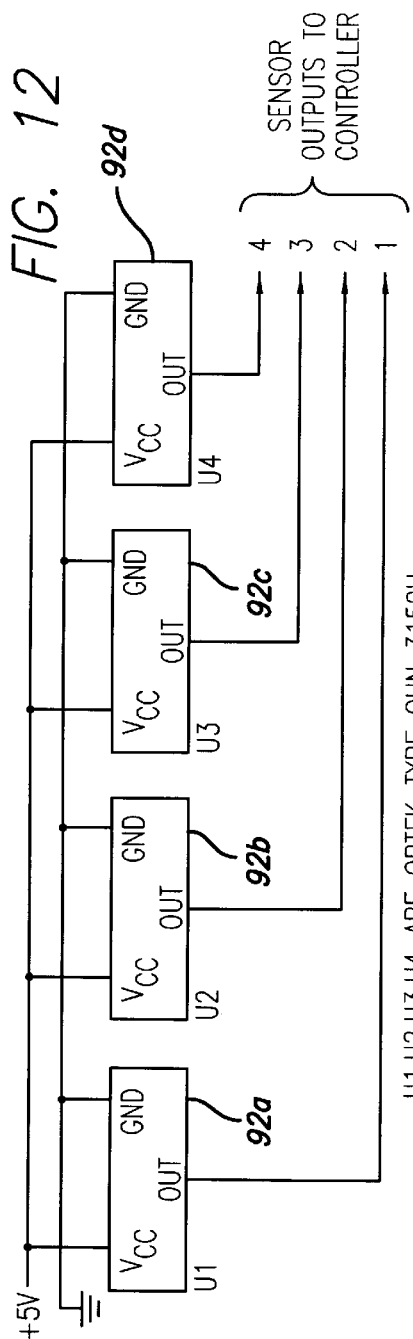
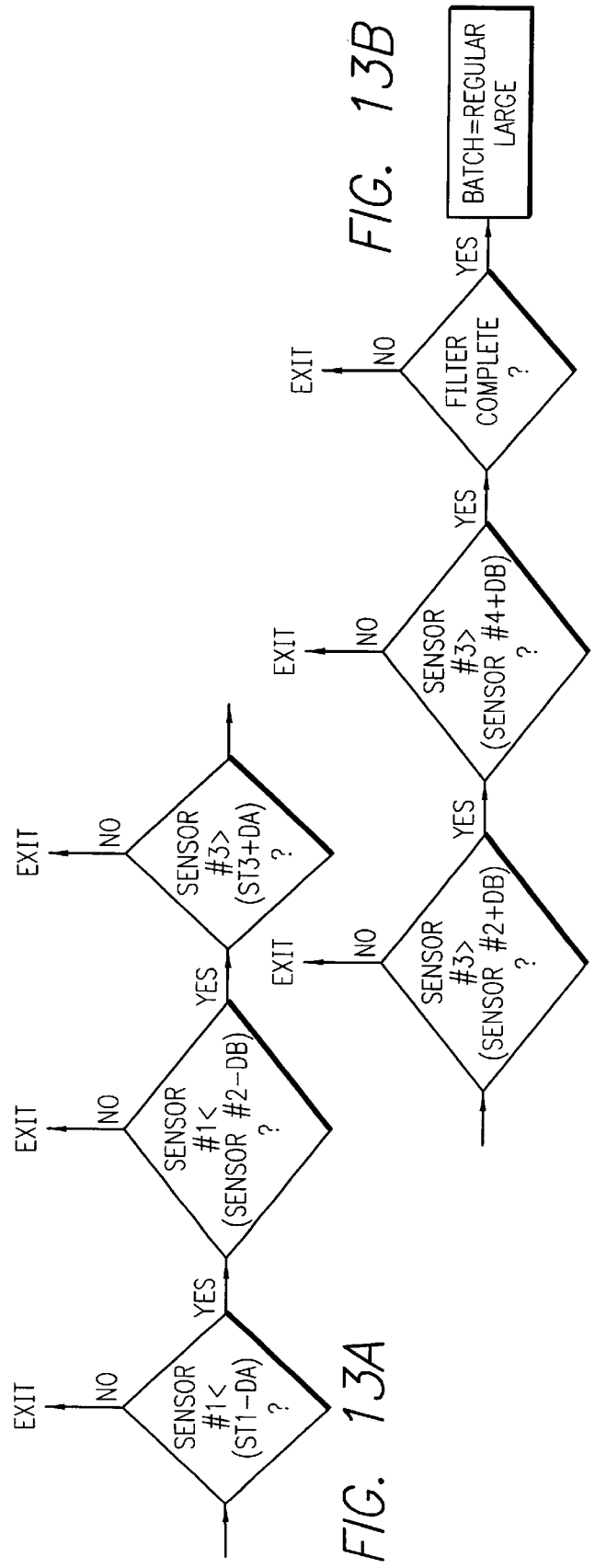

BEVERAGE MAKER-FUNNEL COMBINATION AND METHOD OF USE

CROSS-REFERENCE

This application is a continuation-in-part application of U.S. patent application Ser. No. 09/337,102, filed on Jun. 21, 1999 and entitled "Wireless Grinder-Brewer Interface and Method of Use", now U.S. Pat. No. 6,238,721.

BACKGROUND OF THE INVENTION

This invention is generally directed to a novel wireless coffee grinder and coffee brewer interface and its method of use. More particularly, the invention contemplates a novel wireless coffee grinder and coffee brewer interface which utilizes a brew funnel which can be mounted on either the coffee grinder or the coffee brewer to communicate information regarding batch size and type to the coffee grinder and to the coffee brewer.

U.S. Pat. No. 5,186,399, which identifies the same assignee as the present application, describes a system of connecting a multiple batch size brewer and a dual hopper grinder in order to coordinate the amount of ground coffee with the selected brewing volume. This system could possibly result in some users being confused about setting the switches on the coffee grinder and on the coffee brewer to achieve the desired results. This problem is compounded when a dual head coffee brewer is used with a dual hopper coffee grinder, then complicated further when a single coffee grinder services more than one coffee brewer. In addition, the grinding operation is generally much faster than a brewing cycle (seconds versus minutes). Consequently, it is feasible for one coffee grinder to service several coffee brewers. Due to the complexity and expense of the switching and interconnect cables, however, a maximum of two coffee brewers are used with the system disclosed in the '399 patent.

The present invention provides a novel structure and method which overcomes the problems found in the system disclosed in the '399 patent. Other features and advantages will become apparent upon a reading of the attached specification, in combination with a study of the drawings.

OBJECTS AND SUMMARY OF THE INVENTION

A general object of the present invention is to provide a novel wireless coffee grinder and coffee brewer interface and its method of use.

An object of the present invention is to provide a novel wireless coffee grinder and coffee brewer interface which utilizes a brew funnel which can be mounted on either the coffee grinder or the coffee brewer to communicate information regarding batch size and type to the coffee grinder and to the coffee brewer.

Briefly, and in accordance with the foregoing, the present invention discloses a brew funnel having a selector thereon which can be set by a user to indicate a desired batch size and type of coffee. Sensors on an associated coffee grinder and on an associated coffee brewer are capable of sensing the structure to grind an appropriate amount of coffee and to brew an appropriate amount of coffee, respectively, when the brew funnel is mounted thereon.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 3 is a partial fragmentary side elevational view of the brew funnel shown in FIG. 1, with a fragmentary portion of the brew funnel being shown in cross-section, and a cross-sectional view of a portion of a machine, such as a coffee brewer or coffee grinder, to which the brew funnel is attached;

FIG. 4 is a schematic view of the selector on the brew funnel of FIG. 1 and sensors in the associated machine;

FIG. 5 is an output chart showing voltages generated under various settings for the embodiment of FIGS. 1–4;

FIG. 6 is schematic diagram of the Hall effect sensor circuitry for the embodiment of FIGS. 1–4;

FIG. 9 is a top elevational view of a portion of the brew funnel and cross-sectional view of a portion of a machine, such as a coffee brewer or coffee grinder, to which the brew funnel is attached;

FIG. 10 is a cross-sectional view of the brew funnel and the machine along line 10—10 in FIG. 8;

FIG. 11 is an output chart showing voltages generated under various settings for the embodiment of FIGS. 5–10;

FIG. 12 is schematic diagram of the Hall effect sensor circuitry for the embodiment of FIGS. 5–10; and FIGS. 13A and 13B show a flow chart for detecting a large batch of regular coffee for the embodiment of FIGS. 5–10.

DETAILED DESCRIPTION OF THE ILLUSTRATED EMBODIMENT

Figure 1:
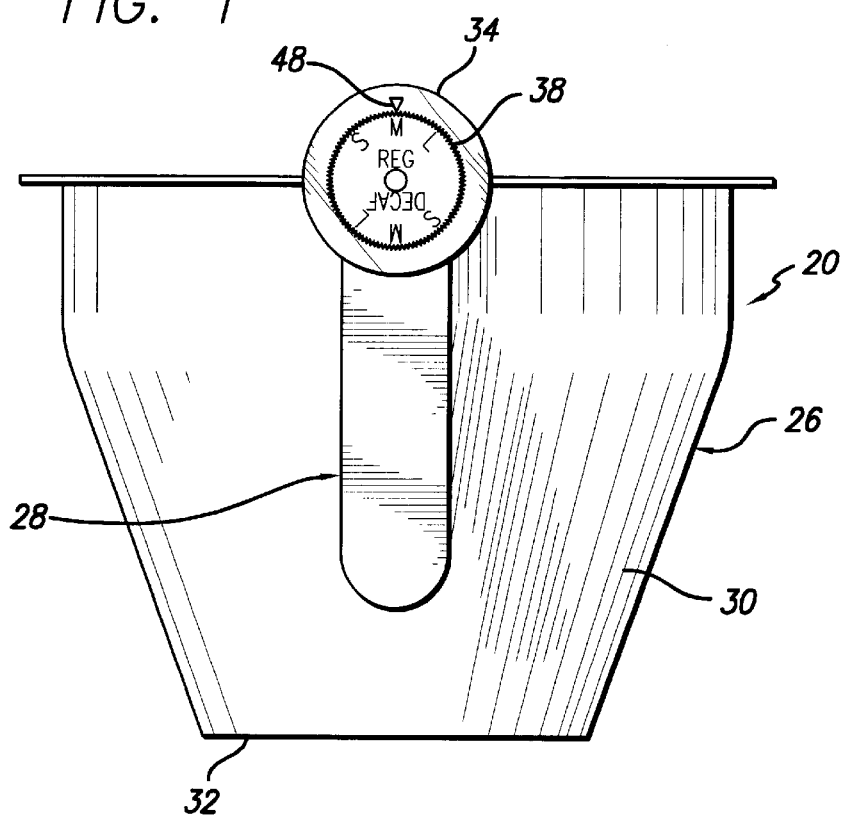
FIG. 1 is a side elevational view of a brew funnel which incorporates the features of a first embodiment of the invention.
Figure 2:
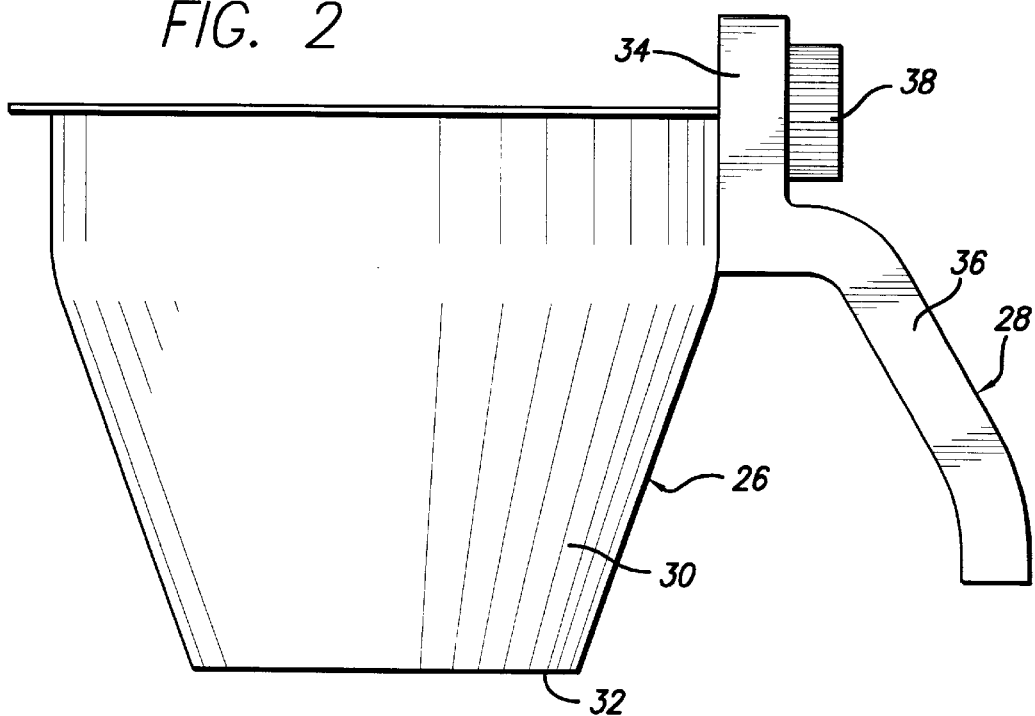
FIG. 2 is a left side elevational view of the brew funnel shown in FIG. 1.
Figure 8:
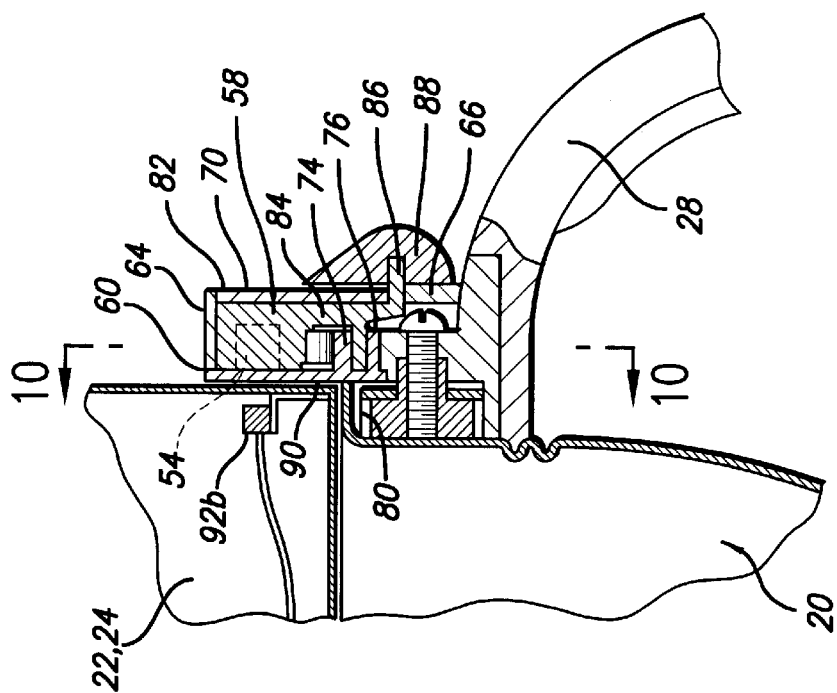
FIG. 8 is a cross-sectional view of the brew funnel and the machine along line 8—8 in FIG. 7.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention provides a novel wireless grinder-brewer interface and its method of use. The interface is provided by a brew funnel 20 which can be mounted on a coffee grinder 22 or a coffee brewer 24.

The brew funnel 20 includes a body 26 having a handle 28 mounted thereon. The handle 28 is mounted on the body 26 by conventional means. The body 26 has a side wall 30 which is generally conical and a bottom wall 32 which is generally flat and has an discharge aperture (not shown) therethrough. The upper end of the body 26 is open.

The handle 28 has an upper portion 34 which is aligned with the side wall 30 and a gripping portion 36 which protrudes outwardly from the side wall 30 of the body 26 so that a user can grip the handle 28 and carry the brew funnel 20. A portion of the upper portion 34 of the handle 28 extends upwardly from the uppermost end of the body 26.

The brew funnel 20 has a selector 38, 38a thereon which allows a user to select a desired batch size and type of coffee. A first embodiment of the selector 38 is shown in FIGS. 1–6. A second embodiment of the selector 38a is shown in FIGS. 7–13B.

Attention is directed to the first embodiment of the selector 38. As shown in FIGS. 1–4, the selector 38 takes the form of a knob 38 having a pair of imbedded magnets 40, 42. The knob 38 is rotatably mounted on the handle 28 by conventional means. The knob 28 has an upper portion which extends upwardly from the uppermost end of the body 26 and a lower portion which overlaps the upper end of the body 26. The pair of magnets 40, 42 are imbedded within the knob 38 proximate to the side wall 30 of the body 26 and are diametrically opposed to each other on the knob 38. Magnet 40 is mounted such that its north pole (N) is proximate to the side wall 30 of the body 26 and the south pole (S) is positioned away from the side wall 30 of the body 26. Magnet 42 is oppositely mounted such that its south pole (S) is proximate to the side wall 30 of the body 26 and the north pole (N) is positioned away from the side wall 30 of the body 26.

The exterior surface of the knob 38 has a plurality of indicia thereon, see FIG. 1. One half of the knob 38 has indicia thereon which designates regular coffee (REG) and specifies a batch size of small (S), medium (M) or large (L). The other half of the knob 38 has indicia thereon which designates decaffeinated coffee (DECAF) and specifies a batch size of small (S), medium (M) or large (L). As shown in the drawings for this embodiment, magnet 40 is positioned behind the medium (M) indicia of regular coffee, and magnet 42 is positioned behind the medium (M) indicia of decaffeinated coffee.

Sensors 44a, 44b, 44c are carried on the coffee grinder 22 or on the coffee brewer 24 for sensing the setting selected by the user on the brew funnel 20 when the brew funnel 20 is mounted on apparatus such as the coffee grinder 22 or on the coffee brewer 24. As shown in the drawings for this embodiment, these sensors 44a, 44b, 44c take the form of three (3) Hall effect sensors 44a, 44b, 44c imbedded in a front wall 46 at predetermined positions of the coffee grinder 22 or the coffee brewer 24. The setting on the knob 38 is then wirelessly communicated to the controller of the coffee grinder 22 or to the coffee brewer 24, depending on which apparatus the brew funnel 20 is mounted, to determine a pre-programmed dispensing time, volume or weight. These sensors 44a, 44b, 44c are coupled to a respective controller which controls the operation of the respective apparatus 22 or 24.

When the brew funnel 20 is mounted on the coffee grinder 22 or the coffee brewer 24, the upper portion 34 of the handle 28 which extends upwardly from the uppermost edge of the body 26 and the portion of the rotatable knob 38 thereon align with the front wall 46 of the coffee grinder 22 or the coffee brewer 24 and the magnet, for example and as shown in the drawings for this embodiment, magnet 40, aligns with one of the Hall effect sensors, for example and as shown in the drawings for this embodiment, Hall effect sensor 44b. The Hall effect sensor 44b senses the presence of the magnet 40 and an appropriate voltage is sent to the controller of the coffee grinder 22 which instructs the coffee grinder 22 to grind an appropriate amount of coffee of a particular coffee type or to the control circuity of the coffee brewer 24 to brew an appropriate amount of coffee, depending on which component the brew funnel 20 is mounted.

FIG. 5 shows a chart which illustrates the voltages which would be sent to the controller depending on which setting is selected by the user. The user simply selects a setting by rotating the knob 38 until the desired batch size aligns with the arrow indicia 48 provided on the upper portion 34 of the handle 28, see FIG. 1. Detection of the magnet 40 or 42 by Hall effect sensor 44a indicates a large (L) batch of coffee has been selected; detection of the magnet 40 or 42 by Hall effect sensor 44b indicates a medium (M) batch of coffee has been selected; and detection of the magnet 40 or 42 by Hall effect sensor 44c indicates a small (S) batch of coffee has been selected. Detection of the north polarity of magnet 40 by one of Hall effect sensors 44a, 44b or 44c sends a positive going output voltage to the coffee grinder 22 controller or to the coffee brewer 24 controller, depending on which component the brew funnel 20 is mounted, to indicate that regular coffee has been selected; and detection of the south polarity of magnet 42 by one of Hall effect sensors 44a, 44b or 44c sends a negative going output voltage to the coffee grinder 22 controller or to the coffee brewer 24 controller, depending on which component the brew funnel 20 is mounted, to indicate that decaffeinated coffee has been selected. FIG. 6 illustrates a typical schematic diagram of the Hall effect sensor 44a, 44b, 44c circuitry using commonly available components. As shown in the drawings for this embodiment, the controller would be instructed to process a medium batch of regular coffee. The Hall effect sensor 44b, which senses a medium (M) batch size, would sense the north polarity of magnet 40, thereby indicating a regular coffee selection, and accordingly instruct the controller. If, for example, the knob 38 were set to decaffeinated coffee with a large (L) batch size, Hall effect sensor 44a, which senses a large (L) batch size, would sense the south polarity of magnet 42, thereby indicating a decaffeinated coffee selection, and accordingly instruct the controller.

In use, the user selects the batch size and coffee type by rotating the knob 38 until the associated indicia aligns with the arrow indicia 48. The brew funnel 20 is first mounted on the coffee grinder 22 for the appropriate grinding, and then is physically transported to the coffee brewer 24 for brewing. Therefore, information on batch size and the type of coffee is stored in the brew funnel 20 and is communicated to the coffee grinder 22 and the coffee brewer 24 when the brew funnel 20 is mounted on each. Because the information is carried with the brew funnel 20, there is no need for an interconnecting cable and therefore, the present system is wireless. The elimination of the cable permits the coffee grinder 22 to serve any number of coffee brewers 24. The operation is greatly simplified because only the setting on the knob 38 on the brew funnel 20 is set; there are no switch settings required on the coffee grinder 22 and no switch settings required on the coffee brewer 24.

Attention is directed to the second embodiment of the selector 38a. As shown in FIGS. 7–10, the selector 38a takes the form of a slide switch assembly 50 which has a pair of imbedded magnets 52, 54. The slide switch assembly 50 includes a housing 56 which is mounted on the upper portion 34 of the handle 28 and a slide member 58 which is mounted thereto.

The housing 56 includes a rear wall 60, opposite side walls 62 which extend perpendicularly to the rear wall 60, a top wall 64 which extends perpendicularly to the rear wall 60, and a front wall 66 which is parallel to the rear wall 60 and is connected to the side walls 62 and to the top wall 64. The front wall 66 has a cutout 68 therein in which a cover 70 is mounted by suitable means. The cover 70 covers a portion of the cutout 68, such that a slot 72 is provided between the bottom of the cover 70 and the front wall 66. Upper and lower rail portions 74, 76 protrude outwardly from a bottom section of the rear wall 60 and are perpendicular thereto such that the upper and lower rail portions 74, 76 protrude outwardly toward the cover 70. The upper and lower rail portions 74, 76 are spaced apart from each other and span substantially the entire width of the rear wall 60. The upper rail portion 74 has a plurality of notches 78 therein, see FIG. 10, which are spaced apart from each other, for reasons described herein. The housing 56 may be made of plastic or other suitable material. The upper and lower rail portions 74, 76 are preferably integrally formed with the rear wall 60, but may be formed separately and suitably attached thereto.

The slide member 58 includes an upper portion 80 which is positioned between the upper rail portion 74 and the top wall 64, a lower portion 82 which is positioned between the upper rail portion 74 and the lower rail portion 76 and sits against the upper rail portion 74 and the lower rail portion 76, a connecting portion 84 which connects the upper portion 80 to the lower portion 82 and which sits against the exterior surface of the upper rail portion 74, and a knob connection portion 86 which extends outwardly from the lower portion 82 and through the slot 72 between the cover 70 and the front wall 66. The upper portion 80 sits against the top wall 64 and is spaced from the upper rail portion 74 a predetermined distance. The slide member 58 has a predetermined width which is substantially less than the width of the cutout 68. The slide member 58 may be made of plastic or other suitable material and is preferably a one-piece construction.

A knob 88 is attached to the free end of the knob connection portion 86 by suitable means and overlaps the exterior surface of the cover 70. The knob 88 may be made of plastic or other suitable material.

A steel spring detent 90 is mounted to the upper portion 80 of the slide member 58 and is positioned between the upper portion 80 and the upper rail portion 74 of the housing 56. The spring detent 90 is generally V-shaped and the free ends are imbedded within the upper portion 80 of the slide member 58. The point of spring detent 90 sits against the upper surface of the upper rail portion 74. As the slide member 58 is moved along the slot 72 relative to the housing 56, the spring detent 90 flexes and the point slides across the top surface of the upper rail portion 74. The point of the spring detent 90 will move into and out of the notches 78 as the slide member 58 is moved across the upper rail portion 74 so as to provide a "feel" to the user that the slide member 58 has been correctly positioned along the length of the slot 72.

The pair of magnets 52, 54 are imbedded within the upper portion 80 of the slide member 58 and are proximate to the rear wall 60. The magnets 52, 54 are spaced apart from each other a predetermined distance. Magnet 52 is mounted such that its south pole is proximate to the rear wall 60 and thus proximate to the side wall 30 of the funnel 20, and the north pole is positioned away from the rear wall 60 and thus away from the side wall 30 of the funnel 20. Magnet 54 is oppositely mounted such that its north pole is proximate to the rear wall 60 and thus proximate to the side wall 30 of the funnel 20, and the south pole is positioned away from the rear wall 60 and thus away from the side wall 30 of the funnel 20.

Figure 7:
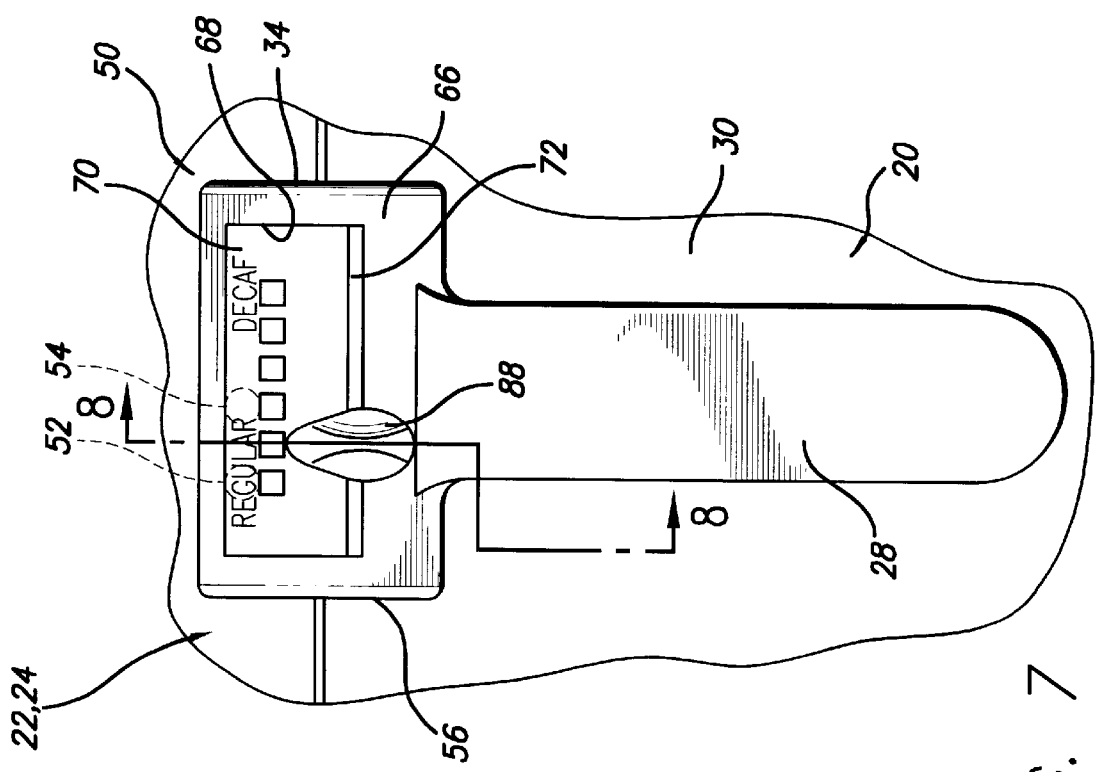
FIG. 7 is a side elevational view of a portion of a brew funnel which incorporates the features of a second embodiment of the invention and showing a portion of a machine, such as a coffee brewer or coffee grinder, to which the brew funnel is attached in side elevation.

The cover 70 has a plurality of indicia thereon, see FIG. 7. One half of the cover 70 has indicia thereon which designates regular coffee (REGULAR) and specifies a batch size of small (by showing a box having less than half being darkened), medium (by showing a box being half being darkened) or large (by showing a box having more than half being darkened). The other half of the cover 70 has indicia thereon which designates decaffeinated coffee (DECAF) and specifies a batch size of small (by showing a box having less than half being darkened), medium (by showing a box being half being darkened) or large (by showing a box having more than half being darkened). As shown in FIGS. 7–10 of this embodiment, the knob 88 is positioned on a medium batch of regular coffee. This results in magnet 52 being positioned behind the small indicia of regular coffee, magnet 54 being positioned behind the large indicia of regular coffee, and there is no magnet positioned behind the medium indicia of regular coffee.

Four sensors 92a, 92b, 92c, 92d are carried on the coffee grinder 22 or on the coffee brewer 24 for sensing the setting selected by the user on the brew funnel 20 when the brew funnel 20 is mounted thereon. Sensor 92a is sensor #1; sensor 92b is sensor #2; sensor 92c is sensor #3; and sensor 92d is sensor #4. As shown in the drawings for this embodiment, these sensors 92a, 92b, 92c, 92d take the form of Hall effect sensors imbedded in the front wall 46 of the coffee grinder 22 or the coffee brewer 24 at predetermined positions thereof. Preferably, the centers of the sensors 92a, 92b, 92c, 92d are spaced 0.25" apart from each other and the centers of the magnets 52, 54 are spaced 0.5" apart from each other. The setting on the knob 88 is then wirelessly communicated to the controller of the coffee grinder 22 or to the coffee brewer 24, depending on which apparatus the brew funnel 20 is mounted, to determine a pre-programmed dispensing time, volume or weight. These sensors 92a, 92b, 92c, 92d are coupled to a respective controller which controls the operation of the respective apparatus 22 or 24.

When the brew funnel 20 is mounted on the coffee grinder 22 or the coffee brewer 24, the slide switch assembly 50 aligns with the front wall 46 of the coffee grinder 22 or the coffee brewer 24. Depending on the type of coffee and the batch size selected by sliding the slide member 58 along the slot 72, one magnet, for example magnet 54, can align with one of the Hall effect sensors, for example Hall effect sensor 92b. This setting is shown in FIGS. 7–10. The Hall effect sensor 92b senses the presence of the magnet 54 and an appropriate voltage is sent to the controller of the coffee grinder 22 which instructs the coffee grinder 22 to grind an appropriate amount of coffee of a particular coffee type or to the controller of the coffee brewer 24 to brew an appropriate amount of coffee, depending on which component the brew funnel 20 is mounted. Again, depending on the type of coffee and the batch size selected by sliding the slide member 58 along the slot 72, one magnet 54 can align with one of the Hall effect sensors, for example Hall effect sensor 92c, and the other magnet 52 can align with another one of the Hall effect sensors, for example Hall effect sensor 92a. The Hall effect sensors 92c, 92a sense the presence of the magnets 54, 52 and an appropriate voltage is sent to the controller of the coffee grinder 22 which instructs the coffee grinder 22 to grind an appropriate amount of coffee of a particular coffee type or to the controller of the coffee brewer 24 to brew an appropriate amount of coffee, depending on which component the brew funnel 20 is mounted.

FIG. 11 shows a chart which illustrates the voltages from each sensor 92a, 92b, 92c, 92d which would be sent to the controller depending on which setting is selected by the user. The user simply selects a setting by sliding the slide member 58 until the point on the knob 88 aligns with the desired batch size and type of coffee. Detection of the south polarity of magnet 54 by Hall effect sensor 92a, with magnet 52 not being detected, indicates a small batch of regular coffee has been selected. Detection of the south polarity of magnet 54 by Hall effect sensor 92b, with magnet 52 not being detected, indicates a medium batch of regular coffee has been selected. Detection of the south polarity of magnet 54 by Hall effect sensor 92c and detection of the north polarity of magnet 52 by Hall effect sensor 92a indicates a large batch of regular coffee has been selected. Detection of the south polarity of magnet 54 by Hall effect sensor 92d and detection of the north polarity of magnet 52 by Hall effect sensor 92b indicates a small batch of decaffeinated coffee has been selected. Detection of the north polarity of magnet 52 by Hall effect sensor 92c, with magnet 54 not being detected, indicates a medium batch of decaffeinated coffee has been selected. Detection of the north polarity of magnet 52 by Hall effect sensor 92d, with magnet 54 not being detected, indicates a large batch of decaffeinated coffee has been selected. Detection of the north polarity of magnet 52 by the Hall effect sensors 92a, 92b, 92c, 92d sends a negative going output voltage to the coffee grinder 22 controller or to the coffee brewer 24 controller, depending on which component the brew funnel 20 is mounted; and detection of the south polarity of magnet 54 by the Hall effect sensors 92a, 92b, 92c, 92d sends a positive going output voltage to the coffee grinder 22 controller or to the coffee brewer 24 controller, depending on which component the brew funnel 20 is mounted.

FIG. 12 illustrates a typical schematic diagram of the Hall effect sensor 92a, 92b, 92c, 92d circuitry using commonly available components. As shown in the drawings for this embodiment, the controller would be instructed to process a medium batch of regular coffee. The Hall effect sensor 92b would sense the south polarity of magnet 54 and send appositive voltage to the controller, and Hall effect sensors 92a, 92b, 92c would not sense magnet 52. The controller would then determine, based on this information, that a medium batch of regular coffee has been selected.

If, for example, the slide member 58 were set to select decaffeinated coffee with a small batch size, Hall effect sensor 92d would sense the south polarity of magnet 54 and send a positive voltage to the controller, and Hall effect sensor 92b would sense the north polarity of magnet 52 and send a negative voltage to the controller, and Hall effect sensors 92a, 92c would not sense any magnets. The controller would then determine, based on this combination, that a small batch of decaffeinated coffee has been selected.

If, for example, the slide member 58 were set to select regular coffee with a large batch size, Hall effect sensor 92c would sense the south polarity of magnet 54 and send a positive voltage to the controller, Hall effect sensor 92a would sense the north polarity of magnet 52 and send a negative voltage to the controller, and Hall effect sensors 92b, 92d would not sense any magnets. The controller would then determine, based on this combination, that a large batch of regular coffee has been selected.

FIGS. 13A and 13B show a flow chart illustrating the detection of a large batch of regular coffee. DA in the flow chart represents the programmable number of analog-to-digital converter counts the sensor must be from the center threshold to make the determination as to whether a north or south polarity is being detected. DB in the flow chart represents the programmable number of analog-to-digital converter counts the sensor must be from the adjacent sensor. ST1 represents the static threshold for sensor 92a; ST2 represents the static threshold for sensor 92b; ST3 represents the static threshold for sensor 92c; and ST4 represents the static threshold for sensor 92d. In addition, the flow chart provides logic which senses the position of the magnets 52, 54 relative to the sensors 92a, 92b, 92c, 92d such that if the knob 88 is positioned between two settings, for example, the knob 88 is positioned between a medium batch of regular coffee and a large batch of regular coffee, the software determines which is the appropriate setting. The software determines the position of the magnets 52, 54 relative to the sensors 92a, 92b, 92c, 92d and determines which sensor the magnets are closest to in order to determine the appropriate setting.

In use, the user selects the batch size and coffee type by sliding the slide member 58 along the slot 72 until the associated indicia aligns with the point on the knob 88. The brew funnel 20 is first mounted on the coffee grinder 22 for the appropriate grinding, and then is physically transported to the coffee brewer 24 for brewing. Therefore, information on batch size and the type of coffee is stored in the brew funnel 20 and is communicated to the coffee grinder 22 and the coffee brewer 24 when the brew funnel 20 is mounted on each. Because the information is carried with the brew funnel 20, there is no need for an interconnecting cable and therefore, the present system is wireless. The elimination of the cable permits the coffee grinder 22 to serve any number of coffee brewers 24. The operation is greatly simplified because only the setting on the knob 88 on the brew funnel 20 is set; there are no switch settings required on the coffee grinder 22 and no switch settings required on the coffee brewer 24.

While the brew funnel 20 is described as having a six position rotary knob 38 or is described as having a slide switch assembly 50, it is to be understood that the number of positions and the switching mechanism can be varied depending on the application, styling requirements, and the like. For example, a push button arrangement could be used.

The sensors 44a, 44b, 44c; 92a, 92b, 92c, 92d provided in the coffee grinder 22 and the coffee brewer 24 can take a variety of forms. The sensors 44a, 44b, 44c; 92a, 92b, 92c, 92d can be effected by any of several different well-known methods of proximity detection, including magnetic, eddy current, capacitance, conductance, photoelectric, inductive, electromagnetic and infrared. In addition, the means 40, 42; 52, 54 on the brew funnel 20 used to convey the information to the coffee grinder 22 and the coffee brewer 24, which is shown in the drawings and is described herein as magnets 40, 42; 52, 54, can take a variety of forms.

The coffee grinder 22 used in the present invention is preferably a dual hopper system, which is known in the art, which has regular coffee beans in a first hopper and decaffeinated coffee beans in a second hopper. Depending on which coffee type is selected and the desired batch size, the appropriate hopper is accessed by opening a respective gate provided at the bottom of the hopper to release the appropriate beans and the appropriate amount of beans to a common grinding unit. While a dual hopper coffee grinder 22 is preferably used in the present invention, it is understood that a single hopper coffee grinder could be used. In this case, a user would simply select a batch size as only one type of coffee would be available.

In addition, while a separate coffee grinder 22 and a separate coffee brewer 24 are preferably used in the present invention, a combined coffee grinder and coffee brewer unit can be used with the present invention. In this situation, the brew funnel 20 is mounted to the combined unit and is not removed therefrom until after the complete grinding and brewing cycle is completed. The coffee grinder can include a dual hopper or single hopper.

While a preferred embodiment of the present invention is shown and described, it is envisioned that those skilled in the art may devise various modifications of the present invention without departing from the spirit and scope of the appended claims.

The invention claimed is:

1. A method of producing a beverage comprising the steps of:
   providing a funnel having a selector actuable by a user for setting an indication of batch size thereon;
   introducing a quantity of beverage making substance into said funnel;
   providing a beverage maker having at least one sensor for sensing said selector, said selector and said at lest one sensor being in wireless communication with each other when said funnel is mounted on said beverage maker;
   setting said selector to a predetermined batch size;
   mounting said funnel on said beverage maker;
   said at least one sensor sensing said setting;
   dispensing water into said funnel for combination with the beverage making substance in said funnel; and
   producing a beverage.

2. A method as defined in claim 1, wherein said selector has at least two settings thereon, and said selector is a knob which can be displaced relative to said funnel, and wherein during said step of the user setting said selector, said knob is displaced to one of said settings.

3. A beverage maker and funnel combination comprising:
   said beverage maker comprising a housing and at least one sensor mounted on said housing; and
   said funnel comprising a body and a selector actuable by a user for setting an indication of batch size, said at least one sensor and said selector being in wireless communication with each other when said funnel is mounted on said beverage maker.

4. The combination as defined in claim 3, wherein said at least one sensor is a Hall effect sensor and said selector comprises at least one magnet.

5. The combination as defined in claim 3, wherein said selector comprises a knob which can be displaced relative to said funnel.

6. The combination as defined in claim 5, wherein said at least one sensor is a Hall effect sensor and said selector further comprises at least one magnet on said knob.

7. The combination as defined in claim 3, wherein said funnel further includes a handle attached to said body and said selector is provided on said handle.

* * * * *